April 6, 1965 C. D. MEE 3,177,304

SPLIT CHANNEL RECORDING TECHNIQUE AND APPARATUS THEREFOR

Filed May 26, 1960 2 Sheets-Sheet 1

INVENTOR
CHARLES DENIS MEE
BY
Brumbaugh, Free, Graves & Donohue
HIS ATTORNEYS

April 6, 1965 C. D. MEE 3,177,304

SPLIT CHANNEL RECORDING TECHNIQUE AND APPARATUS THEREFOR

Filed May 26, 1960 2 Sheets-Sheet 2

INVENTOR
CHARLES DENIS MEE
BY
Brumbaugh, Free, Graves & Donohue
HIS ATTORNEYS

United States Patent Office 3,177,304

Patented Apr. 6, 1965

3,177,304

SPLIT CHANNEL RECORDING TECHNIQUE AND APPARATUS THEREFOR

Charles D. Mee, Greenwich, Conn., assignor to Minnesota Mining & Manufacturing Company, St. Paul, Minn., a corporation of Delaware Filed May 26, 1960, Ser. No. 32,031

5 Claims. (Cl. 179—100.2)

This invention relates to sound recording and reproducing systems, and more particularly to multitrack-magnetic sound recording and reproducing methods and apparatus for use with double coated magnetic tape.

While double coated magnetic tape (i.e., tape having magnetic coatings on opposite sides of a nonmagnetic base) appears very attractive for economic reasons, it has not come into wide use because of the difficulty encountered heretofore in maintaining acceptable separation between the recordings on the two sides of the tape. Two effects appear to be involved. First, a reproducer positioned to respond to signals recorded on one side of the tape inherently will respond in some degree to the signals recorded on the other side of the tape.

Second and more important, the reproducer will respond also to signals originally recorded on the opposite side of the tape but which have become "printed" or transferred to the side adjacent the reproducer as a result of the fact that the two coatings are in contact when in a reel. Such printed signals are relatively large and they may be only 40 db below the desired signal, whereas 55 db has been specified as a maximum for acceptable separation between unrelated signals.

It is an object of the invention, accordingly, to provide a novel method and apparatus for recording signals on both sides of a double coated magnetic tape, in such fashion that the recordings can be reproduced independently without substantial interference from one another.

A further object of the invention is to provide a novel double coated magnetic tape record which is of particular utility in the recording-reproducing method and apparatus of the invention.

Another object of the invention is to provide a new and improved method and apparatus for reproducing records made according to the invention.

These and other objects of the invention are attained by making two recordings in the form of superimposed registered tracks on the opposite sides of the tape, respectively, the character of the two recordings being such that a reproducer designed for optimum response to one of the tracks will not respond significantly to the recording on the other track.

In a preferred embodiment, one recording is made in one track on one side of the tape and a two-track split channel recording is made on the other side of the tape, the two tracks being disposed side by side in superimposed registered relation to the first track. The two tracks comprising the second recording are recorded in opposite polarity so that they will tend to induce in a reproducer responsive to the first track equal and opposite signals which will substantially cancel. By the same token, the first track will tend to induce in a reproducer responsive to the two tracks comprising the second recording equal and opposite signals which will substantially cancel. Therefore, signals can be recorded on both sides of double coated magnetic tape and reproduced therefrom without substantial interference.

Other objects and advantageous features of the present invention will be apparent from the following detailed description of several representative embodiments when taken in conjunction with the accompanying drawings wherein.

Figure 1:
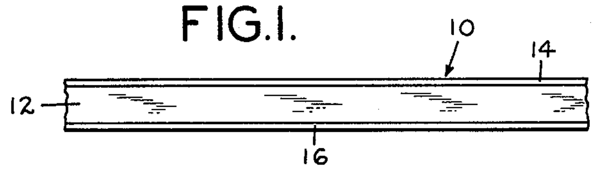
FIG. 1 is a side view of a portion of double coated magnetic tape.

Referring now to FIG. 1, there is shown a conventional double coated magnetic tape 10 comprising a base 12 of plastic material, for example, having coatings 14 and 16 of magnetic material on the opposite sides thereof. As indicated above, where recordings are made on the two coatings 14 and 16 using conventional techniques, it is difficult to reproduce either recording without undesirable interference from the other.

In accordance with the invention, one of the recordings is made on the upper coating 14' (FIG. 2A) in the conventional manner, the arrows indicating the direction of magnetization of the coating from point to point therealong. This recording may be made by a ring-type head 17 having an energizing winding 18 and a narrow gap 19 extending transversely of the coating 14'. On the other side of the tape 10, however, the signal is recorded in two side by side tracks **16*a*' and 16*b*' (FIG. 2B) whose total lateral extension is substantially the same as the width of the track recorded on the coating 14', the pair of tracks 16*a*' and 16*b*' being in superimposed registered relation width-wise with respect to the upper track 14'. The recordings on the tracks 16*a*' and 16*b*'** are identical except that they are recorded in opposite polarity as indicated by the arrows in the figure.

The tracks **16*a*' and 16*b*' may be recorded by a pair of side by side magnetic heads 17*a*' and 17*b*', having windings 18*a*' and 18*b*' connected in series opposition and gaps 19*a*' and 19*b*' extending colinearly and transversely of the tape 10**.

Figures 2A, 2B, 3, 4:
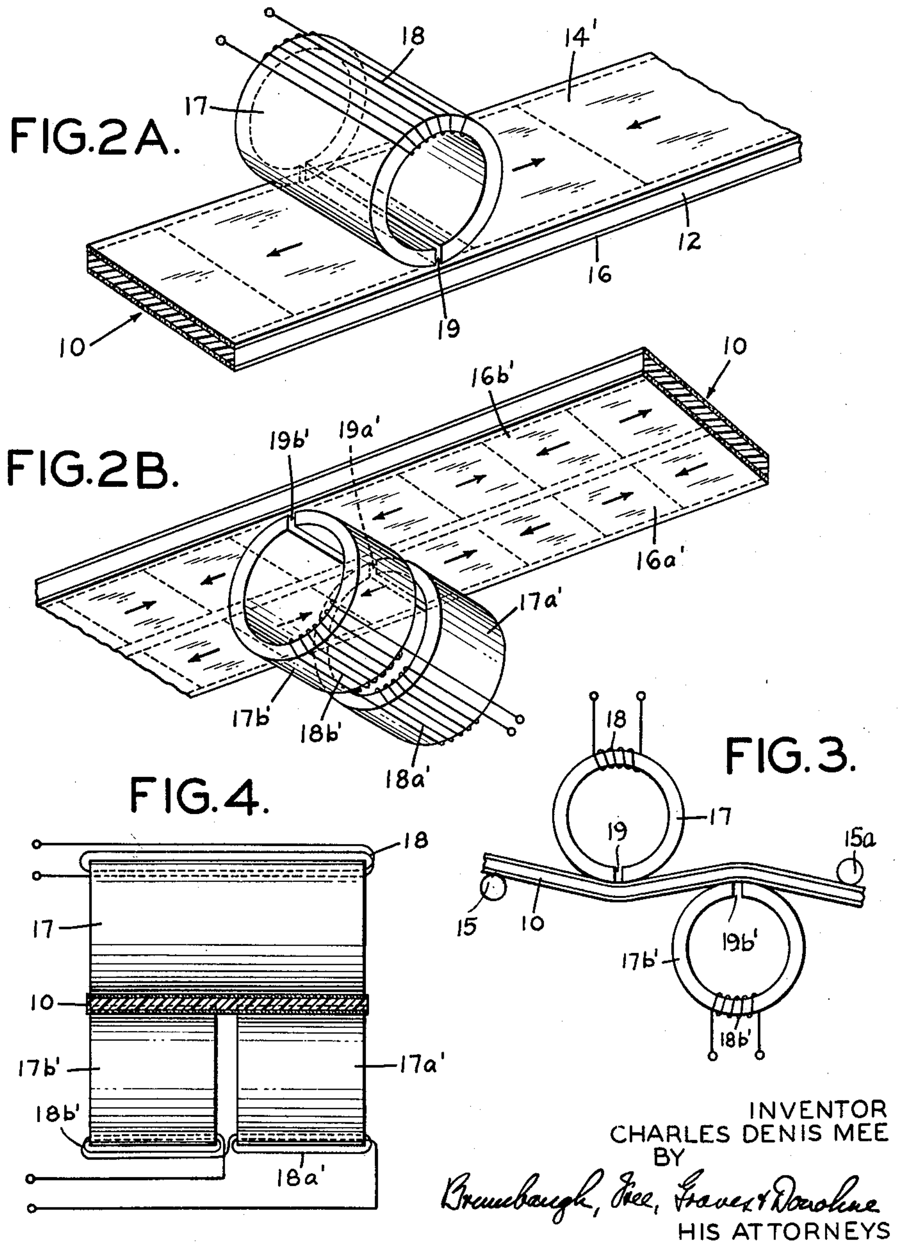
FIGS. 2A and 2B depict typical magnetic recordings made on the opposite sides of a portion of double coated magnetic tape according to the invention, together with magnetic heads suitable for making the recordings.
FIGS. 3 and 4 are side and front views, respectively, of single track and split track recorder-reproducer magnetic heads, respectively, suitable for recording simultaneously on opposite sides of a magnetic tape according to the invention.

If a magnetic tape having a pattern of magnetic recordings on the opposite sides thereof as shown in FIGS. 2A and 2B is replayed by causing the tape to travel past the head 17 (FIG. 2A) with its upper track 14' closely adjacent the gap 19, the recording made on the upper track 17 originally will be reproduced. However, the oppositely polarized tracks **16*a*', and 16*b*' (FIG. 2B) on the underside of the tape will induce equal and opposite voltages in the winding 18 (FIG. 2A) which tend to cancel. Similarly, any signal "printed" on the coating 14' by reason of its having been in contact with the two tracks 16*a*' and 16*b*' when the tape is reeled will induce substantially equal and opposite voltages in the winding 18 which tend to cancel. As a result, the head 17** (FIG. 3) is substantially insensitive to the multitrack recordings on the other side thereof.

In similar fashion, when the tape 10 is replayed with the side by side tracks **16*a*' and 16*b*' (FIG. 2B) closely adjacent the gaps in the heads 17*a*' and 17*b*', respectively, the recording originally made in the tracks 16*a*' and 16*b*' will be faithfully reproduced with little interference from the recording made on the coating 14'. As in the preceding case, any direct or printed signals from the single track 14' will induce substantially equal signals in the windings 18*a*' and 18*b*'** which tend to cancel out, since these windings are connected in series opposition.

For instance, using a track width of 100 mils, the sensitivity of one reproducing head to the recording made by the other is 25–30 db below the sensitivity to its own recording when the two recordings cover the same area. This applies at least down to a wavelength of 1 mil. Thus, in the region of maximum print (a wavelength of about 3 mils), the sensitivity to the printed signal is 25 db lower than the sensitivity to the desired recorded signal.

The tracks recorded on the opposite sides of the tape 10 may carry related information (e.g., left and right stereophonic channels, respectively), in which event, the replayed printed signal will be at least 60 db below the desired signal. In addition, the pickup of the recording on the layer remote from the replay head will be reduced by 25 db below that previously obtained with conventional recording where the difference in replayed signal level from the two sides is due to separation effects only. Thus, for a tape speed of 1⅞" per second, the separation of left and right channels is now 25 db at 50 cycles per second, rising to 50 db to 1 kilocycle per second and 100 db at 3 kilocycles per second.

Where stereophonically related tracks are to be recorded simultaneously on opposite sides of the tape, this may be accomplished by threading the tape between a single head 17 and multiple heads 17*a'* and 17*b'*, as shown in FIGS. 3 and 4. In order to enable the heads to make adequate contact with the two sides of the tape, the heads should be spaced apart along the tape as shown in FIG. 3, the spacing being of the order of ten times the coating thickness. The same magnetic head assembly may be used to reproduce simultaneously the two recordings on the opposite sides of the tape. Rollers 15 and 15*a* serve as means to support the tape.

Figure 5:
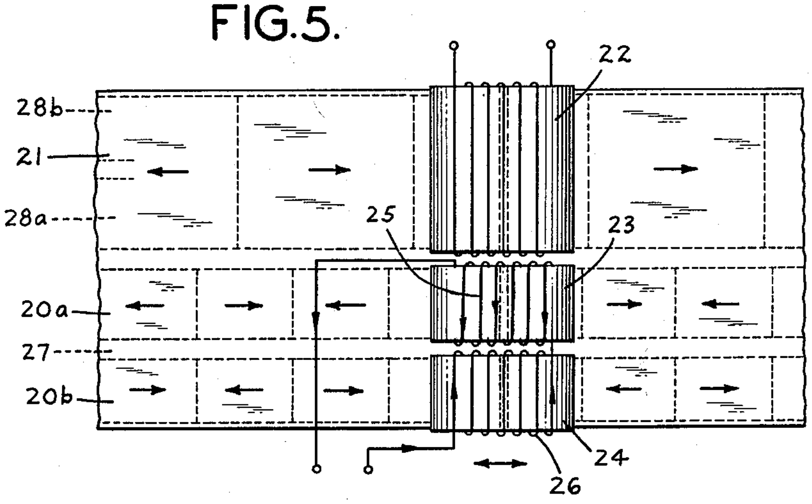
FIGS. 5 and 7 depict recordings of two sets of stereophonic signals made on opposite sides of a double coated magnetic tape using a multitrack recorder-reproducer head.
Figure 7:
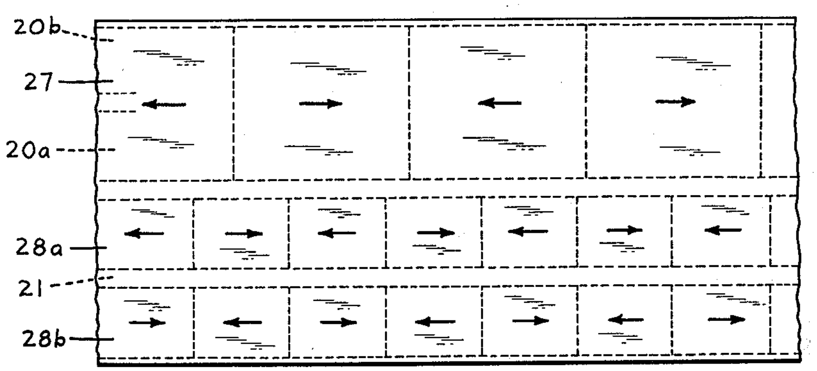
Figure 6:
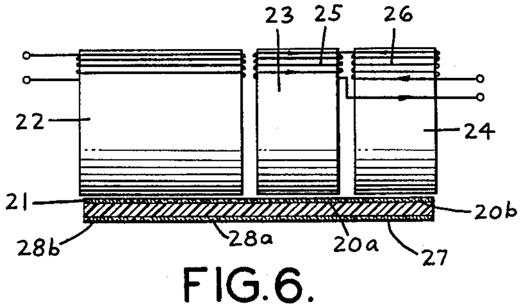
FIG. 6 is a front view of the multitrack recorder reproducer head shown in FIG. 5.

The necessity for threading the tape between upper and lower heads can be avoided by making two stereophonically related recordings on the same side of the tape as shown in FIGS. 5, 6 and 7. Thus, one stereophonic channel can be recorded as two identical side by side tracks 20*a* and 20*b* of opposite polarity (FIG. 5) on one side of the tape, and a second stereophonic channel can be recorded in a single track 21 alongside the tracks 20*a* and 20*b* and equal in width to the total width across the other two tracks. These three tracks may be made with a multitrack head comprising a head 22 for recording the track 21 and two heads 23 and 24 having windings 25 and 26 connected in series opposition for recording the tracks 20*a* and 20*b*.

On the other side of the tape, stereophonically related left and right channel signals may be recorded, one in the form of a wide track 27 (FIG. 7) and the other in the form of two narrow tracks 28*a* and 28*b*. The wide track 27 should lie directly under the pair of tracks 20*a* and 20*b* (FIG. 5), while the tracks 28*a* and 28*b* should lie directly beneath the wide track 21 on the upper side of the tape. The tracks 27, 28*a* and 28*b* may be recorded on the underside of the tape by the multiple head shown in FIG. 5.

If the three tracks on either side of the tape shown in FIGS. 5 and 7 are played back with a three track head of the type shown in FIGS. 5 and 6, the two stereophonic channels will be reproduced with substantial reduction of the interference that would normally occur by reason of the presence of the three other tracks on the opposite side of the tape.

At a tape speed of 1⅞" per second, the four recordings made on the two sides of the tape in FIGS. 5 and 7 may be independently replayed, two at a time, with 25 db separation at 50 cycles per second, 50 db at 1 kilocycle per second, and 100 db at 3 kilocycles per second using a multitrack head of the type shown in FIG. 5.

If it is desired to achieve greater isolation of unrelated signals in the low frequency region than is afforded by the split channel technique described above, this may be accomplished by using other known methods for separating recordings made on double coated tape (e.g., inclined tracks, high permeability pressure pads, etc.) in conjunction with the split channel technique.

The invention thus provides a novel and highly effective method and apparatus for recording on and reproducing from double coated magnetic tape. By recording one signal in adjoining tracks of opposite magnetic polarity on one side of the tape and another signal in a single track on the other side of the tape, in superimposed registered relation to the two adjoining tracks on the other side, a reproducer designed to respond to the single track will not respond appreciably to the adjoining tracks, and vice-versa. Accordingly, either recording can be reproduced without substantial interference from the one on the other side of the tape.

The specific embodiments described above are obviously susceptible of modification within the spirit of the invention. Accordingly, the invention is intended to encompass all modifications coming within the scope of the following claims.

I claim:

1. A magnetic record comprising a first track on one side magnetized lengthwise in accordance with a given signal, and a second track on the opposite side magnetized lengthwise in accordance with another signal, said tracks being superimposed in substantial longitudinal registry, each longitudinal segment of said second track having side by side portions of opposite magnetic polarity and of substantially the same magnetic intensity, whereby the net magnetic flux from the second track to the first track is substantially zero and the magnetic flux from the first track to the second track is distributed substantially equally between said side by side portions.

2. A magnetic record comprising a first longitudinally extending track on one side magnetized lengthwise in accordance with a given signal, a pair of longitudinally extending side by side tracks on the opposite side each magnetized lengthwise in accordance with another signal but of opposite magnetic polarity with respect to each other, said first track and said pair of tracks being superimposed in substantial longitudinal registry.

3. A magnetic record comprising a first track on one side magnetized lengthwise in accordance with a given signal, a second track alongside said first track on said one side magnetized lengthwise in accordance with another signal, side by side portions of said second track being of opposite magnetic polarity, a third track on the opposite side in superimposed registered relation to said second track and magnetized lengthwise according to a third signal, a fourth track on said opposite side in superimposed registered relation to said first track and magnetized lengthwise according to a fourth signal, side by side portions of said fourth track being of opposite magnetic polarity.

4. In magnetic recording-reproducing apparatus, the combination of means for supporting a magnetic tape in a tape transport path, a first magnetic recording head on one side of said path having a recording gap adjacent and extending transversely of said path, a second magnetic head on the other side of said path, said second head having two side by side recording gaps adjacent and together extending transversely of said path, said two gaps being in spaced apart superimposed relation to the recording gap of said first head, and means adapted to be energized in response to a given signal for establishing magnetic fields of opposite polarity in the respective recording gaps of said second head.

5. In a method of recording on a medium having magnetizable material on opposite sides thereof, the steps of magnetizing first successive elemental areas on one side of said medium in accordance with a given signal, magnetizing second successive elemental areas on said one side of said medium adjacent to said first successive elemental areas in accordance with said given signal such that adjacent ones of said first and second successive elemental areas are of opposite magnetic polarity, and magnetizing third successive elemental areas on the opposite side of said medium adjacent to one of said first and second successive elemental areas in accordance with another signal.

References Cited by the Examiner

UNITED STATES PATENTS

| | | | |
|---|---|---|---|
| 2,709,204 | 5/55 | Holmes | 179—100.2 |
| 2,878,321 | 3/59 | Davis | 179—100.2 |
| 2,923,642 | 2/60 | Hausen | 179—100.2 |

OTHER REFERENCES

R.C.A. TN No. 398, June 1960, available in the Scientific Library, and in 179—100, 2MI.

IRVING L. SRAGOW, *Primary Examiner.*

NEWTON N. LOVEWELL, BERNARD KONICK, WALTER W. BURNS, Jr., *Examiners.*